(12) United States Patent
Brott et al.

(10) Patent No.: US 8,098,347 B2
(45) Date of Patent: Jan. 17, 2012

(54) STEREOSCOPIC 3D LIQUID CRYSTAL DISPLAY WITH GRADED LIGHT GUIDE LIGHT EXTRACTION FEATURES

(75) Inventors: Robert L. Brott, Woodbury, MN (US); Michael J. Sykora, Deer Park, WI (US); John C. Schultz, Afton, MN (US); John C. Nelson, The Sea Ranch, CA (US)

(73) Assignee: 3M Innovative Properties Company, Saint Paul, MN (US)

( * ) Notice: Subject to any disclaimer, the term of this patent is extended or adjusted under 35 U.S.C. 154(b) by 533 days.

(21) Appl. No.: 12/275,586

(22) Filed: Nov. 21, 2008

(65) Prior Publication Data

US 2010/0128187 A1 May 27, 2010

(51) Int. Cl.
*G02F 1/1335* (2006.01)

(52) U.S. Cl. ............. 349/62; 349/65; 349/12; 362/97.2; 362/339

(58) Field of Classification Search .................... 349/67, 349/65, 62, 15; 362/97.2, 626, 339, 615
See application file for complete search history.

(56) References Cited

U.S. PATENT DOCUMENTS

| | | | |
|---|---|---|---|
| 5,897,184 A | 4/1999 | Eichenlaub et al. | |
| 7,210,836 B2 | 5/2007 | Sasagawa | |
| 7,327,929 B2 | 2/2008 | Chien | |
| 7,530,721 B2 | 5/2009 | Mi et al. | |
| 7,918,597 B2 * | 4/2011 | Kunimochi | 362/608 |
| 2006/0132673 A1 | 6/2006 | Ito | |
| 2007/0188872 A1 | 8/2007 | Kao et al. | |
| 2007/0189033 A1 * | 8/2007 | Watanabe et al. | 362/606 |
| 2008/0084513 A1 | 4/2008 | Brott | |
| 2008/0086289 A1 | 4/2008 | Brott | |
| 2009/0034294 A1 * | 2/2009 | Ookawa et al. | 362/620 |

FOREIGN PATENT DOCUMENTS

| | | |
|---|---|---|
| JP | 2006-302710 | 11/2006 |
| KR | 10-2007-0075686 | 2/2007 |
| WO | WO 01/27663 A1 | 4/2001 |

OTHER PUBLICATIONS

Ishikawa et al. "New Design for a Highly Collimating Turning Film," Eastman Kodak Company, SID 06 Digest, p. 514-517, 2006.

* cited by examiner

*Primary Examiner* — Thoi Duong

(57) ABSTRACT

A backlight for a stereoscopic 3D liquid crystal display apparatus includes a light guide having a light emission surface and an opposing light extraction surface, a first side extends between the light emission surface and the light extraction surface, and a second side extends between the light emission surface and the light extraction surface, the second side opposing the first side. A centerline extends parallel to the first side and second side and is equidistant from the first side and the second side. A center elongated prism extends along the centerline and forms a portion of the light extraction surface. A plurality of elongated prisms extend parallel to the center elongated prism wherein the prisms are progressively more canted for each subsequent elongated prism further from the center elongated prism. A plurality of light sources disposed along the first side and the second side.

12 Claims, 3 Drawing Sheets

STEREOSCOPIC 3D LIQUID CRYSTAL DISPLAY WITH GRADED LIGHT GUIDE LIGHT EXTRACTION FEATURES

BACKGROUND

A stereoscopic 3D display usually presents an observer with images with parallax from individual right and left eye viewpoints. There are two methods of providing the two eyes of the observer with the parallax images in a time sequential manner. In one method, the observer utilizes a pair of shutter or 3D glasses which transmit or block light from the viewer's eyes in synchronization with alternating the left/right image display. Similarly, in another method, right eye and left eye viewpoints are alternatively displayed and presented to the respective eyes of the observer but without the use of 3D glasses. This second method is referred to as autostereoscopic and is sometimes desirable for stereo 3D viewing because separate glasses are not needed though there is limited permissible head motion.

A liquid crystal display (LCD) is a sample and hold display device such that the image at any point or pixel of the display is stable until that pixel is updated at the next image refresh time, typically $\frac{1}{60}$ of a second or faster. In such a sample and hold system, displaying different images, specifically displaying alternating left and right images for an autostereoscopic display, requires careful timing sequencing of the light sources so that, for example, the left eye image light source is not on during the display of data for the right eye and vice versa.

In order to have good left/right image separation, light is delivered alternately to each eye. An attempt to achieve this is to provide a light guide that extracts light by means of translationally invariant and symmetric prism features on a back surface of the light guide. Since the extraction features are the same over the extent of the light guide, the amount of light extracted when either the left or right side light source is illuminated decreases, more or less exponentially, as the light guide is traversed. This construction can often provide a non-uniform illumination of the stereoscopic 3D display and resulting in a degraded 3D viewing experience. The viewer perceived 3D image will be uniform across the display as long as the individual left side and right side non-uniformities do not exceed 5 to 1, or more preferably 3 to 1.

BRIEF SUMMARY

The present disclosure relates to a light guide for a time sequential autostereoscopic 3D display that provides uniform extraction efficiency across the display so that a viewer can fuse two separate images to perceive depth.

In one particular embodiment, a backlight for a stereoscopic 3D liquid crystal display apparatus includes a light guide having a light emission surface and an opposing light extraction surface, a first side extends between the light emission surface and the light extraction surface, and a second side extends between the light emission surface and the light extraction surface, the second side opposing the first side. A centerline extends parallel to the first side and second side and is equidistant from the first side and the second side. A center elongated prism extends along the centerline and forms a portion of the light extraction surface. A plurality of elongated prisms extend parallel to the center elongated prism wherein the prisms are progressively more canted for each subsequent elongated prism further from the center elongated prism. A plurality of light sources disposed along the first side and the second side.

In another particular embodiment, a backlight for a stereoscopic 3D liquid crystal display apparatus includes a light guide having a light emission surface and an opposing light extraction surface, a first side extends between the light emission surface and the light extraction surface, and a second side extends between the light emission surface and the light extraction surface, the second side opposing the first side. A centerline extends parallel to the first side and second side and is equidistant from the first side and the second side. A center elongated prism extends along the centerline and forms a portion of the light extraction surface. A plurality of elongated prisms extend parallel to the center elongated prism wherein each prism comprises a riser surface parallel to the first side or second side, the riser surface increases in height for each subsequent elongated prism further from the center elongated prism. A plurality of light sources disposed along the first side and the second side.

In another particular embodiment, a stereoscopic 3D liquid crystal display apparatus includes a liquid crystal display panel, drive electronics configured to drive the liquid crystal display panel with alternating left eye and right eye images, and a backlight positioned to provide light to the liquid crystal display panel. The backlight includes a light guide. The light guide includes a light emission surface and an opposing light extraction surface, a first side extends between the light emission surface and the light extraction surface, and a second side extends between the light emission surface and the light extraction surface, the second side opposing the first side. A centerline extends parallel to the first side and second side and is equidistant from the first side and the second side. A center elongated prism extends along the centerline and forms a portion of the light extraction surface. A plurality of elongated prisms extend parallel to the center elongated prism wherein the prisms are progressively more canted for each subsequent elongated prism further from the center elongated prism. A plurality of light sources disposed along the first side for alternately transmitting light into the first side and illuminating a left eye image and a plurality of light source disposed along the second side for transmitting light into the second side and illuminating a right eye image.

In another particular embodiment, a stereoscopic 3D liquid crystal display apparatus includes a liquid crystal display panel, drive electronics configured to drive the liquid crystal display panel with alternating left eye and right eye images, and a backlight positioned to provide light to the liquid crystal display panel. The backlight includes a light guide. The light guide includes a light emission surface and an opposing light extraction surface, a first side extends between the light emission surface and the light extraction surface, and a second side extends between the light emission surface and the light extraction surface, the second side opposing the first side. A centerline extends parallel to the first side and second side and is equidistant from the first side and the second side. A center elongated prism extends along the centerline and forms a portion of the light extraction surface. A plurality of elongated prisms extend parallel to the center elongated prism wherein each prism comprises a riser surface parallel to the first side or second side, the riser surface increases in height for each subsequent elongated prism further from the center elongated prism. A plurality of light sources disposed along the first side for alternately transmitting light into the first side and illuminating a left eye image and a plurality of light source disposed along the second side for transmitting light into the second side and illuminating a right eye image These and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings, in which.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
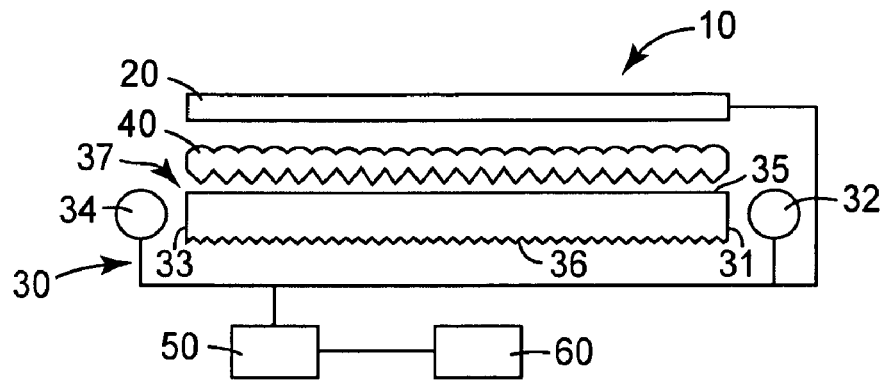
FIG. 1 is a schematic side view of an illustrative display apparatus.

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

The present disclosure relates to light guide for a time sequential autostereoscopic 3D display that provides uniform extraction efficiency across the display so that a viewer can fuse two separate images to perceive depth. The light guide includes a light extraction surface with prism features that are progressively graded away from a symmetric centerline elongated prism feature. The progressively graded prism features provide uniform extraction efficiency across the light guide when lighting the light guide from the first side and then lighting the light guide from the second side in a time sequential manner for autostereoscopic 3D image display. In some embodiments the prisms are progressively more canted as the distance from the centerline of the light guide increases. In some embodiments the prisms are progressively less canted as the distance from the centerline of the light guide increases. In other embodiments the prisms include a riser surface (making it a quadrilateral) that is generally parallel to the first or second side of the light guide and this riser surface can increase or decrease in height as the distance form the centerline of the light guide increases. While the prisms are shown having only linear surfaces, it is understood that the prisms may have curved surfaces at, for example, an apex of the prism or a valley between the prisms, and the like. While the present disclosure is not so limited, an appreciation of various aspects of the disclosure will be gained through a discussion of the examples provided below.

FIG. 1 is a schematic side view of an illustrative display apparatus 10. The display apparatus includes a liquid crystal display panel 20 and a backlight 30 positioned to provide light to the liquid crystal display panel 20. The backlight 30 includes a right eye image solid state light source 32 or plurality of first light sources 32, and a left eye image solid state light source 34 or plurality of second light sources 34, capable of being modulated between the right eye image solid state light source 32 and the left eye image solid state light source 34 at a rate of, in many embodiments, at least 90 Hertz and a light guide 37. A double sided prism film 40 is disposed between the liquid crystal display panel 20 and the backlight 30.

The liquid crystal display panel 20 and/or backlight 30 can have any useful shape or configuration. In many embodiments, the liquid crystal display panel 20 and backlight 30 has a square or rectangular shape. However, in some embodiments, the liquid crystal display panel 20 and/or backlight 30 has more than four sides or is a curved shape. While the present disclosure is directed to any stereoscopic 3D backlight including those requiring shutter glasses or more than a single light guide and associated liquid crystal display panel, the present disclosure is particularly useful for autostereoscopic displays.

A synchronization driving element 50 is electrically connected to the backlight 30 plurality of first and second light sources 32, 34 and the liquid crystal display panel 20. The synchronization driving element 50 synchronizes activation and deactivation (i.e., modulation) of the right eye image solid state light source 32 and the left eye image solid state light source 34 as image frames are provided at a rate of, in many embodiments, 90 frames per second or greater to the liquid crystal display panel 20 to produce a flicker-free still image sequence, video stream or rendered computer graphics. An image (e.g., video or computer rendered graphics) source 60 is connected to the synchronization driving element 50 and provides the images frames (e.g., right eye images and left eye images) to the liquid crystal display panel 20.

The liquid crystal display panel 20 can be any useful transmissive liquid crystal display panel. In many embodiments, liquid crystal display panel 20 has a frame response time of less than 16 milliseconds, or less than 10 milliseconds, or less than 5 milliseconds. Commercially available transmissive liquid crystal display panels having a frame response time of less than 10 milliseconds, or less than 5 milliseconds, or less than 3 milliseconds, are for example Toshiba Matsushita Display's (TMD) optically compensated bend (OCB) mode panel LTA090A220F (Toshiba Matsushita Display Technology Co., Ltd., Japan).

The backlight 30 can be any useful backlight that can be modulated between a right eye image solid state light source 32 and left eye image solid state light source 34 at a rate of, in many embodiments, at least 90 Hertz, or 100 Hertz, or 110 Hertz, or 120 Hertz, or greater than 120 Hertz.

The illustrated light guide 37 includes a first side 31 or first light input surface 31 adjacent to the plurality of first light sources 32 or right eye image solid state light source 32 and an opposing second side 33 or second light input surface 33 adjacent to the plurality of second light sources 34 or left eye image solid state light source 34. A light extraction surface 36 extends between the first side 31 and second side 33, and a light emission surface 35, opposite the light extraction surface 36, extends between the first side 31 and second side 33. The light extraction surface 36 substantially re-directs (e.g., reflects, extracts, and the like) light and the light emission surface 35 substantially transmits light. In many embodiments, a highly reflective surface is on or adjacent to the light extraction surface 36 to assist in re-directing light out through the light emission surface 35.

The light extraction surface 36 includes a plurality of extraction elements such as, for example, elongated prism features that are progressively graded away from a symmetric centerline elongated prism, as described below. In many embodiments, these prism features can extend in a direction parallel to the first side 31 and second side 33 or parallel to the linear prism and lenticular features of the double sided prism film 40.

The solid state light sources can be any useful solid state light source that can be modulated at a rate of, for example, at least 90 Hertz. In many embodiments, the solid state light source is a plurality of light emitting diodes such as, for example, Nichia NSSW020B (Nichia Chemical Industries, Ltd., Japan). In other embodiments, the solid state light source is a plurality of laser diodes or organic light emitting diodes (i.e., OLEDs). The solid state light sources can emit any number of visible light wavelengths such as red, blue, and/or green, or range or combinations of wavelengths to produce, for example, white light. The backlight can be a single layer of optically clear material with light sources at both ends or two (or more) layers of optically clear material with a light source per layer which preferentially extract light in a desired direction for each layer.

The double sided prism film 40 can be any useful prism film having a linear lenticular structure on a first side and a linear prismatic structure on an opposing side. The linear lenticular structure and the linear prism structure are parallel. The double sided prism film 40 transmits light from the scanning backlight to the liquid crystal display panel 20 at the proper angles such that a viewer perceives depth in the displayed image. Useful, double sided prism films are described in United States Patent Publication Nos. 2005/0052750 and 2005/0276071, which are incorporated herein to the extent they do not conflict with the present disclosure.

The image source 60 can be any useful image source capable of providing images frames (e.g., right eye images and left eye images) such as, for example, a video source or a computer rendered graphic source. In many embodiments, the video source can provide image frames from 50 to 60 Hertz or greater. In many embodiments, the computer rendered graphic source can provide image frames from 100 to 120 Hertz or greater.

The computer rendered graphic source can provide gaming content, medical imaging content, computer aided design content, and the like. The computer rendered graphic source can include a graphics processing unit such as, for example, an Nvidia FX5200 graphics card, a Nvidia GeForce 9750 GTX graphics card or, for mobile solutions such as laptop computers, an Nvidia GeForce GO 7900 GS graphics card. The computer rendered graphic source can also incorporate appropriate stereo driver software such as, for example, OpenGL, DirectX, or Nvidia proprietary 3D stereo drivers.

The video source can provide video content. The video source can include a graphics processing unit such as, for example, an Nvidia Quadro FX1400 graphics card. The video source can also incorporate appropriate stereo driver software such as, for example, OpenGL, DirectX, or Nvidia proprietary 3D stereo drivers.

The synchronization driving element 50 can include any useful driving element providing synchronizing activation and deactivation (i.e., modulation) of the right eye image solid state light source 32 and the left eye image solid state light source 34 with image frames provided at a rate of, for example, 90 frames per second or greater to the liquid crystal display panel 20 to produce a flicker-free video or rendered computer graphics. The synchronization driving element 50 can include a video interface such as, for example, a Westar VP-7 video adaptor (Westar Display Technologies, Inc., St. Charles, Mo.) coupled to custom solid state light source drive electronics.

Figure 2A:
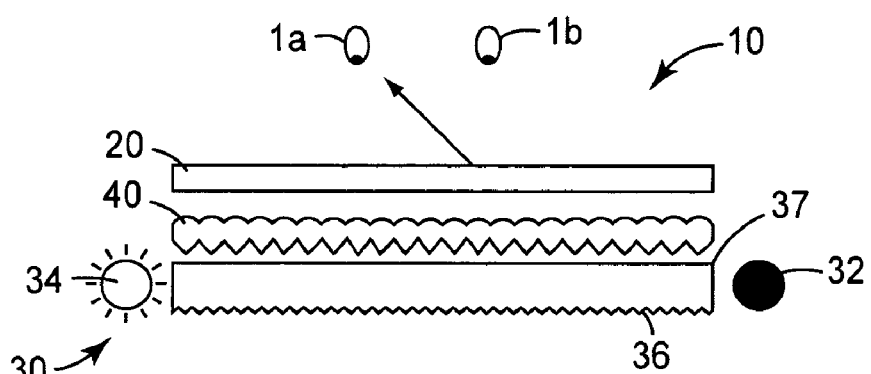
FIG. 2A and FIG. 2B are schematic side views of an illustrative display apparatus in operation.
Figure 2B:
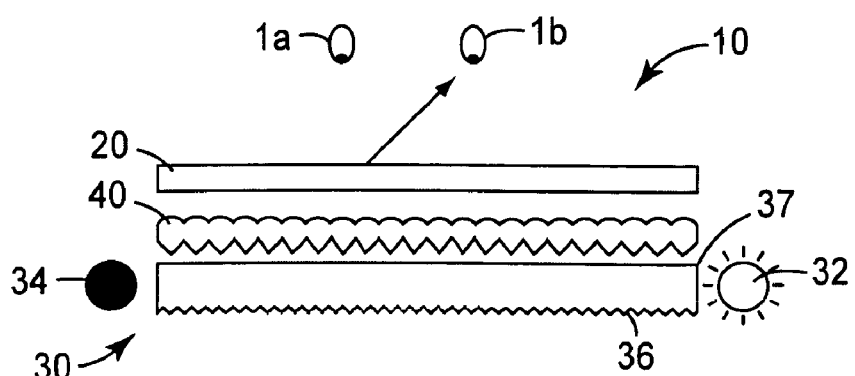

FIG. 2A and FIG. 2B are schematic side views of an illustrative display apparatus 10 in operation. In FIG. 2A the left eye image solid state light source 34 (i.e., plurality of second light sources 34) is illuminated and the right eye image solid state light source 32 (i.e., plurality of first light sources 32) is not illuminated. In this state, the light emitted from the left eye image solid state light source 34 transmits through the light guide 37, through the double sided prism sheet 40, and liquid crystal panel 20 providing a left eye image directed toward the left eye 1a of an viewer or observer. In FIG. 2B the right eye image solid state light source 32 is illuminated and the left eye image solid state light source 34 is not illuminated. In this state, the light emitted from the right eye solid state light source 32 transmits through the light guide 37, through the double sided prism sheet 40, and liquid crystal panel 20 providing a right eye image directed toward the right eye 1b of an viewer or observer. It is understood that while the right eye solid state light source 32 is located on the right side of the light guide and the left eye image solid state light source 34 is located on the left side of the light guide, is some embodiments, the right eye solid state light source 32 is located on the left side of the light guide and the left eye image solid state light source 34 is located on the right side of the light guide.

The light sources 32, 34 can be air coupled or index matched to the light guide 37. For example, a packaged light source device (e.g., LED) can be edge-coupled without index matching material into the light guide 37. Alternatively, packaged or bare die LEDs can be index matched and/or encapsulated in the edge of the light guide for increased efficiency. This feature may include additional optical features, e.g., injection wedge shapes, on the ends of the light guide to efficiently transport the input light. The LEDs can be alternatively embedded in the edge or side 31, 33 of the light guide 37 with appropriate features to efficiently collect and collimate the LED light into TIR (i.e., total internal reflection) modes of the light guide.

Liquid crystal display panels 20 have a refresh or image update rate that is variable, but for the purposes of this example, a 60 Hz refresh rate is presumed. This means that a new image is presented to the viewer every $\frac{1}{60}$ second or 16.67 milliseconds (msec). In the 3D system this means that at time t=0 (zero) the right image of frame one is presented. At time t=16.67 msec the left image of frame one is presented. At time t=2*16.67 msec the right image of frame two is presented. At time t=3*16.67 msec the left image of frame two is presented, and this process is thus repeated. The effective frame rate is half that of a normal imaging system because for each image a left eye and right eye view of that image is presented.

In this example, turning the first plurality of light sources on to light the right (or left) image at time t=0 provides light to the right (or left) image, respectively. At time t=16.67 msec the second image left or right, starts to be put in place. This image replaces the "time t=0 image" from the top of the LCD panel to the bottom of the LCD, which takes 16.67 msec to complete in this example. Non-scanned solutions turn off all the first plurality of light sources and then turns on all the second plurality of light sources sometime during this transition.

Providing at least 45 left eye images and at least 45 right eye images (alternating between right eye and left eye images and the images are possibly a repeat of the previous image pair) to a viewer per second provides a flicker-free 3D image to the viewer. Accordingly, displaying different right and left viewpoint image pairs from computer rendered images or images acquired from still image cameras or video image cameras, when displayed in synchronization with the switching of the light sources 32 and 34, enables the viewer to visually fuse the two different images, creating the perception of depth from the flat panel display. A limitation of this visually flicker-free operation is that, as discussed above, the backlight should not be on until the new image that is being displayed on the liquid crystal display panel has stabilized; otherwise cross-talk and a poor stereoscopic image will be perceived.

Figure 3:
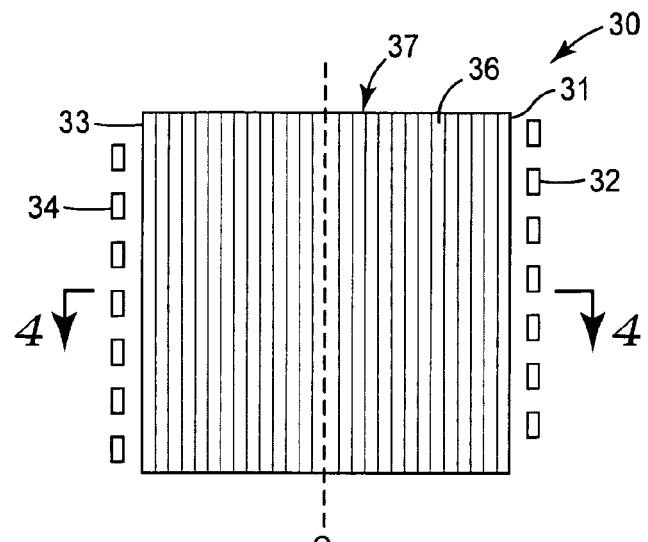
FIG. 3 is a bottom view schematic diagram of an illustrative light guide.
Figure 4:
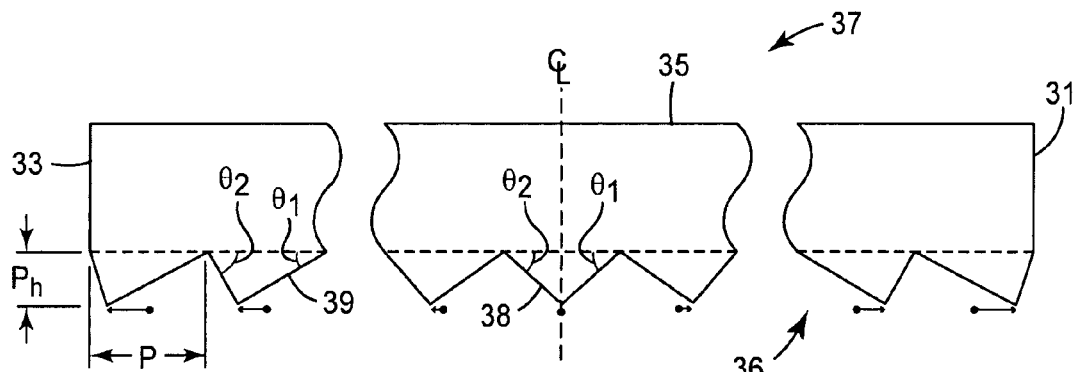
FIG. 4 Is a cross-sectional view of the illustrative light guide having canted prisms taken along line 4-4.
Figure 5:
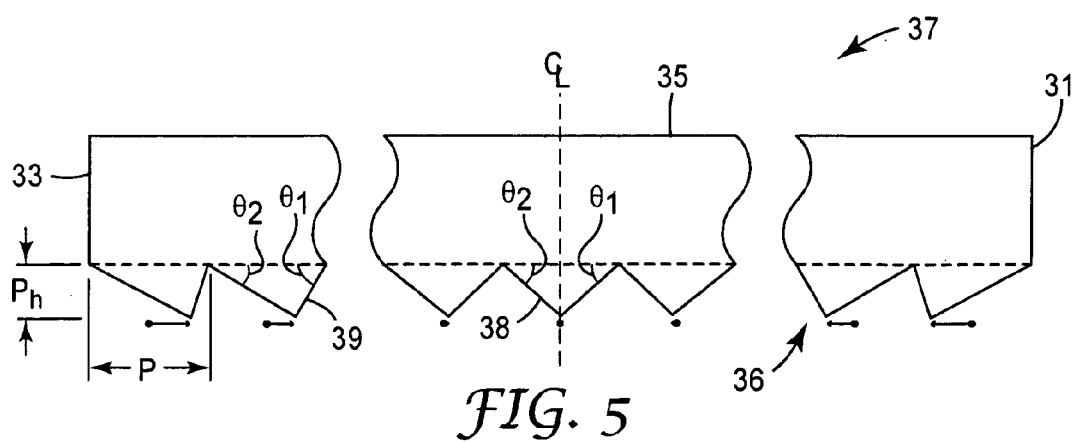
FIG. 5 is cross-sectional view of another illustrative light guide having canted prisms taken along line 4-4.

FIG. 3 is a bottom view schematic diagram of an illustrative light guide 37. FIG. 4 Is a cross-sectional view of the illustrative light guide 37 taken along line 4-4. FIG. 5 is cross-sectional view of another illustrative light guide 37 taken along line 4-4.

A light guide 37 includes a light emission surface 35 and an opposing light extraction surface 36 (as described above) and a first side 31 extends between the light emission surface 35 and the light extraction surface 36. A second side 33 extends between the light emission surface 35 and the light extraction surface 36. The second side 33 opposes the first side 31 and in many embodiments, the second side 33 is parallel with the first side 31.

A centerline $C_L$ extends parallel to the first side 31 and the second side 33 and is equidistant from (e.g., between) the first side 31 and the second side 33. A center elongated prism 38 extends along the centerline $C_L$ and forms a portion of the light extraction surface 36. A plurality of elongated prisms 39 extend parallel to the center elongated prism 38 wherein the prisms 39 are progressively more canted for each subsequent elongated prism 39 further from the center elongated prism 38. A plurality of light sources 32 and 34 are disposed along the first side 31 and the second side 33, respectively.

In many embodiments the center elongated prism 38 is a symmetrical prism (i.e., where a first side inner angle $\theta_1$ and the second inner angle $\theta_2$ are equal). In many embodiments the plurality of elongated prisms 39 are symmetrical about the centerline $C_L$. In some embodiments, the first side inner angle $\theta_1$ of each prism 39 decreases for each prism 39 closer to the second side 33, as illustrated in FIG. 4. In some embodiments, the first side inner angle $\theta_1$ of each prism 39 increases for each prism 39 closer to the second side 33, as illustrated in FIG. 5. In some embodiments each subsequent prism progressively increases or decreases the first side inner angle $\theta_1$ for each prism 39 closer to the second side 33.

In some embodiments the plurality of elongated prisms 39 have a constant pitch p (e.g., linear distance along a base of each prism). In other embodiments, the plurality of elongated prisms 39 have a non-uniform pitch. In some embodiments the plurality of elongated prisms 39 have a constant pitch in a range from 25 to 250 micrometers or in a range from 50 to 150 micrometers. In many embodiments the prisms 39 have a constant height $P_H$.

The progressive prism canting factor can be thought of as how the apex of the canted prism is moving as the prisms are located away from the center line $C_L$. The apex of each prism can be between −½ pitch and ½ pitch (as illustrated by the dot and arrow adjacent to each apex where the dot illustrated a symmetric prism apex location). Each facet on its own has a location of the apex of the prism somewhere between −½ pitch and +½ pitch. Scaling to dimensionless units (ratioing everything to the pitch) then the apex is between −½ and ½. Consider the prisms located farther and farther from the center line $C_L$. FIG. 5 illustrates the apex "moving" progressively towards the centerline as the prisms are located farther and farther from the centerline $C_L$. FIG. 4 illustrates the apex "moving" progressively away from the centerline as the prisms are located farther and farther from the centerline $C_L$. The final facet apex location in the viewable area can be described as "alpha". For example, an alpha of −0.5 or 0.5 would correspond to a right triangle at the edge of the viewable area.

Raytrace modeling (utilizing TracePro software from Lambda Research Corporation) was preformed on an example of FIG. 4 and FIG. 5 and a control example having non-canted prisms. All three examples had a pitch of 81.6 micrometers and 871 prisms, with a constant height. The center prism had inner angles of 6.5 degrees for the control example and the FIG. 5 example. The FIG. 4 example had center prism inner angles of 7.5 degrees. In the FIG. 5 example, the apex location varies linearly between perfectly centered at the centerline, and shrunk to a position of −0.3 at the edge. In the FIG. 4 example, the apex location varies linearly between perfectly centered at the centerline, and shrunk to a position of +0.15 at the edge. Results of the Raytrace model for the control example show a system efficiency of 37% and an individual left side and right side source non-uniformity of 2.9; for the FIG. 5 example show a system efficiency of 58% and an individual left side and right side source non-uniformity of 2.7; and for the FIG. 4 example show a system efficiency of 59% and an individual left side and right side source non-uniformity of 3.0.

Figure 6:
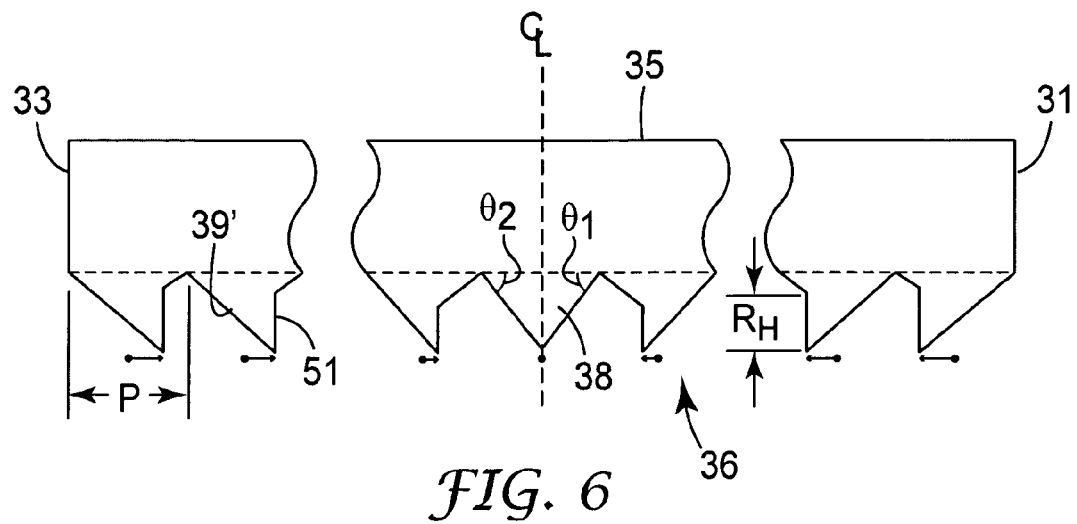
FIG. 6 is a cross-sectional view of another illustrative light guide having riser prisms.
Figure 7:
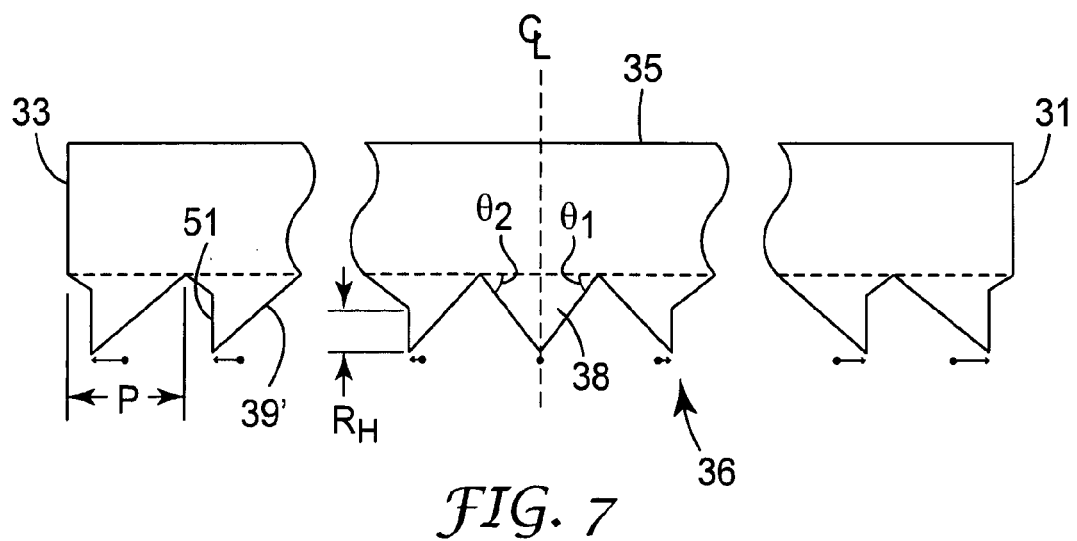
FIG. 7 is a cross-sectional view of another illustrative light guide having riser prisms.

FIG. 6 is a cross-sectional view of another illustrative light guide having riser prisms. FIG. 7 is a cross-sectional view of another illustrative light guide having riser prisms.

A light guide includes a light emission surface 35 and an opposing light extraction surface 36 (as described above) and a first side 31 extends between the light emission surface 35 and the light extraction surface 36. A second side 33 extends between the light emission surface 35 and the light extraction surface 36. The second side 33 opposes the first side 31 and in many embodiments, the second side 33 is parallel with the first side 31.

A centerline $C_L$ extends parallel to the first side 31 and second side 33 and is equidistant from the first side 31 and the second side 33. A center elongated prism 38 extends along the centerline $C_L$ and forms a portion of the light extraction surface 36. A plurality of elongated prisms 39' extend parallel to the center elongated prism 38 wherein each prism 39' includes a riser surface 51 parallel to the first side 31 or second side 33. The riser surface 51 increases in height $R_H$ for each subsequent elongated prism 39' further from the center elongated prism 38.

In many embodiments the center elongated prism 38 is a symmetrical prism (i.e., where a first side inner angle $\theta_1$ and the second inner angle $\theta_2$ are equal) without a riser surface 51. In many embodiments the plurality of elongated prisms 39' are symmetrical about the centerline $C_L$. In some embodiments the riser surface 51 faces the center elongated prism 38, as illustrated in FIG. 6. In some embodiments the riser surface 51 is directed away from the center elongated prism 38, as illustrated in FIG. 7. In many embodiments the riser surface 51 increases in height $R_H$ progressively for each subsequent elongated prism 39' further from the center elongated prism 38, as illustrated in FIG. 6.

In some embodiments the plurality of elongated prisms 39' have a constant pitch p (e.g., linear distance of prism base). In other embodiments, the plurality of elongated prisms 39' have a non-uniform pitch. In some embodiments the plurality of elongated prisms 39' have a constant pitch in a range from 25 to 250 micrometers or in a range from 50 to 150 micrometers. In some embodiments the prisms 39' have a constant height. In some embodiments the prisms 39' have a varying height depending on how far the prism is located from the center prism 38. FIG. 6 and FIG. 7 illustrate prisms 39' having constant inner angles (i.e., where a first side inner angle $\theta_1$ and the second inner angle $\theta_2$ are equal) but the riser surface increases as the prism 39' is located further from the centerline $C_L$ and the height of each prism 39' increases as the prism 39' is located further from the centerline $C_L$.

The progressive riser prism (illustrated as a quadrilateral) can be thought of as how the apex of the riser prism is moving as the prisms are located away from the center line $C_L$. The apex of each prism can be between $-\frac{1}{2}$ pitch and $\frac{1}{2}$ pitch (as illustrated by the dot and arrow adjacent to each apex where the dot illustrated a symmetric prism apex location), as described above. FIG. 6 illustrates the apex "moving" progressively towards the centerline as the prisms are located farther and farther from the centerline $C_L$. FIG. 7 illustrates the apex "moving" progressively away from the centerline as the prisms are located farther and farther from the centerline $C_L$.

Thus, embodiments of the STEREOSCOPIC 3D LIQUID CRYSTAL DISPLAY WITH GRADED LIGHT GUIDE LIGHT EXTRACTION FEATURES are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation, and the present invention is limited only by the claims that follow.

What is claimed is:

1. A backlight for a stereoscopic 3D liquid crystal display apparatus, comprising:
   a light guide comprising:
      a light emission surface and an opposing light extraction surface;
      a first side extends between the light emission surface and the light extraction surface;
      a second side extends between the light emission surface and the light extraction surface, the second side opposing the first side;
      a centerline extends parallel to the first side and second side and is equidistant from the first side and the second side;
      a center elongated prism extends along the centerline and forms a portion of the light extraction surface;
      a plurality of elongated prisms that are contiguous from the centerline and form the light extraction surface and extend parallel to the center elongated prism wherein the prisms are progressively more canted for each subsequent elongated prism further from the center elongated prism; and
   a plurality of light sources disposed along the first side and the second side.

2. A backlight for a stereoscopic 3D liquid crystal display apparatus according to claim 1, wherein the plurality of elongated prisms are symmetrical about the centerline.

3. A backlight for a stereoscopic 3D liquid crystal display apparatus according to claim 1, wherein the center elongated prism is symmetrical.

4. A backlight for a stereoscopic 3D liquid crystal display apparatus according to claim 1, wherein each prism of the plurality of prisms is defined by a first side inner angle and a second side inner angle, and the first side inner angle of each prism decreases for each prism closer to the second side.

5. A backlight for a stereoscopic 3D liquid crystal display apparatus according to claim 1, wherein each prism of the plurality of prisms is defined by a first side inner angle and a second side inner angle, and the first side inner angle of each prism progressively increases for each prism closer to the second side.

6. A backlight for a stereoscopic 3D liquid crystal display apparatus according to claim 1, wherein each prism of the plurality of prisms has a constant pitch.

7. A backlight for a stereoscopic 3D liquid crystal display apparatus according to claim 6, wherein the pitch is in a range from 50 to 150 micrometers.

8. A backlight for a stereoscopic 3D liquid crystal display apparatus according to claim 1, wherein each prism of the plurality of prisms has a constant height.

9. A stereoscopic 3D liquid crystal display apparatus, comprising:
   a liquid crystal display panel;
   drive electronics configured to drive the liquid crystal display panel with alternating left eye and right eye images; and
   a backlight positioned to provide light to the liquid crystal display panel, the backlight comprising:
      a light guide comprising:
         a light emission surface and an opposing light extraction surface;
         a first side extends between the light emission surface and the light extraction surface;
         a second side extends between the light emission surface and the light extraction surface, the second side opposing the first side;
         a centerline extends parallel to the first side and second side and is equidistant from the first side and the second side;
         a center elongated prism extends along the centerline and forms a portion of the light extraction surface;
         a plurality of elongated prisms that are contiguous from the centerline and form the light extraction surface and extend parallel to the center elongated prism wherein the prisms are progressively more canted for each subsequent elongated prism further from the center elongated prism; and
      a plurality of light sources disposed along the first side for alternately transmitting light into the first side and illuminating a left eye image and a plurality of light source disposed along the second side for transmitting light into the second side and illuminating a right eye image.

10. A backlight for a stereoscopic 3D liquid crystal display apparatus according to claim 9, wherein the plurality of elongated prisms are symmetrical about the centerline.

11. A backlight for a stereoscopic 3D liquid crystal display apparatus according to claim 9, wherein the center elongated prism is symmetrical.

12. A backlight for a stereoscopic 3D liquid crystal display apparatus according to claim 9, wherein each prism of the plurality of prisms is defined by a first side inner angle and a second side inner angle, and the first side inner angle of each prism progressively decreases or progressively increases for each prism closer to the second side.

* * * * *